United States Patent
Ono

(10) Patent No.: US 10,133,252 B2
(45) Date of Patent: Nov. 20, 2018

(54) NETWORK UNIT

(71) Applicant: Ryoji Ono, Tokyo (JP)

(72) Inventor: Ryoji Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 476 days.

(21) Appl. No.: 14/762,013

(22) PCT Filed: Mar. 28, 2013

(86) PCT No.: PCT/JP2013/059375
§ 371 (c)(1),
(2) Date: Jul. 20, 2015

(87) PCT Pub. No.: WO2014/155627
PCT Pub. Date: Oct. 2, 2014

(65) Prior Publication Data
US 2015/0362902 A1    Dec. 17, 2015

(51) Int. Cl.
*G05B 19/05* (2006.01)
*G05B 15/02* (2006.01)
(Continued)

(52) U.S. Cl.
CPC ........... *G05B 19/052* (2013.01); *G05B 15/02* (2013.01); *H04L 41/085* (2013.01); *H04L 43/04* (2013.01); *G05B 2219/15077* (2013.01)

(58) Field of Classification Search
CPC ........ G05B 19/052; G05B 2219/15077; G05B 15/02; H04L 43/04; H04L 41/085
See application file for complete search history.

(56) References Cited

U.S. PATENT DOCUMENTS

| | | | | |
|---|---|---|---|---|
| 5,963,444 A | * | 10/1999 | Shidara | G05B 19/052 700/2 |
| 6,385,497 B1 | * | 5/2002 | Ogushi | G03F 7/70525 700/109 |

(Continued)

FOREIGN PATENT DOCUMENTS

| | | |
|---|---|---|
| JP | 04-032905 A | 2/1992 |
| JP | 04-149705 A | 5/1992 |

(Continued)

OTHER PUBLICATIONS

International Search Report of PCT/JP2013/059375 dated Jun. 18, 2013 [PCT/ISA/210].

*Primary Examiner* — Joe Chacko
(74) *Attorney, Agent, or Firm* — Sughrue Mion, PLLC; Richard C. Turner

(57) ABSTRACT

To provide a network unit that includes a diagnosis-information management unit that transmits a diagnosis-information transmission request by designating a destination network number while assuming a value other than a station number; a routing control unit that holds routing information indicating correspondence between a destination control network and identification information, and that relay-controls the diagnosis-information transmission request received from the diagnosis-information management unit, another network unit connected to the same programmable logic controller, or a control network connected to the network unit in accordance with the routing information; and a diagnosis-information creation unit that creates the diagnosis information when the diagnosis-information transmission request having a network number of the control network connected to the network unit as the destination (Continued)

network number is received, and it transmits the created diagnosis information to a sender of the diagnosis-information transmission request.

14 Claims, 7 Drawing Sheets

(51) Int. Cl.
*H04L 12/24* (2006.01)
*H04L 12/26* (2006.01)

(56) References Cited

U.S. PATENT DOCUMENTS

| | | | |
|---|---|---|---|
| 6,813,523 B2* | 11/2004 | Mauro | G05B 19/0421 700/10 |
| 8,406,903 B2 | 3/2013 | Mitamura et al. | |
| 2006/0230188 A1 | 10/2006 | Shirane | |
| 2009/0013220 A1* | 1/2009 | Kawano | G05B 23/0262 714/49 |
| 2010/0205535 A1* | 8/2010 | Mitamura | G05B 19/0421 715/735 |
| 2010/0313051 A1* | 12/2010 | Hua | H04B 3/542 713/323 |
| 2013/0003742 A1 | 1/2013 | Yamasaki | |
| 2013/0241586 A1* | 9/2013 | Horikawa | G05B 23/0267 324/750.3 |

FOREIGN PATENT DOCUMENTS

| | | |
|---|---|---|
| JP | 11-039007 A | 2/1999 |
| JP | 3551206 B2 | 8/2004 |
| JP | 2006-277728 A | 10/2006 |
| JP | 2009-037319 A | 2/2009 |
| JP | 2010-218042 A | 9/2010 |
| JP | 2011-171804 A | 9/2011 |
| WO | 2008/146380 A1 | 12/2008 |
| WO | 2011/083565 A1 | 7/2011 |

* cited by examiner

FIG.4A

| DESTINATION NETWORK NUMBER | RELAY STATION | |
| --- | --- | --- |
| | NETWORK NUMBER | STATION NUMBER |
| 2 | 1 | 2 |
| 3 | 1 | 2 |

| DESTINATION NETWORK NUMBER | RELAY STATION | |
| --- | --- | --- |
| | NETWORK NUMBER | STATION NUMBER |
| 2 | 2 | 1 |
| 3 | 2 | 1 |

| DESTINATION NETWORK NUMBER | RELAY STATION | |
| --- | --- | --- |
| | NETWORK NUMBER | STATION NUMBER |
| 1 | 1 | 2 |
| 3 | 2 | 2 |

304a  304b  304c

| NETWORK NUMBER | DIAGNOSIS INFORMATION | FLAG |
|---|---|---|
| 1 | ×××××× | ACQUIRED |
| 2 | △△△△△△ | NOT ACQUIRED |
| 3 | ○○○○○○ | NOT ACQUIRED |

NETWORK UNIT

CROSS REFERENCE TO RELATED APPLICATIONS

This application is a National Stage of International Application No. PCT/JP2013/059375, filed Mar. 28, 2013, the contents of which are incorporated herein by reference in its entirety.

FIELD

The present invention relates to a network unit that collects diagnosis information indicating the states of a plurality of control networks (i.e., whether the control networks are in a state that can perform communication normally) without requiring the user to explicitly designate a target device from which to collect diagnosis information in a control system configured from the plurality of control networks.

BACKGROUND

In a control system, a programmable logic controller and a control network are used. The control network mainly performs transmission and reception of control signals and data between the programmable logic controller and a field device such as a remote input/output device.

The control system is often configured to include a plurality of control networks. The control networks constituting the control system are connected to each other by a relay station that relays data between the control networks. The relay station connects, via a network unit, each of the two or more control networks that are to be connected.

Generally, in such control systems, diagnosis information on the control networks can be acquired via the network unit connected to the control networks.

To acquire the diagnosis information, an engineering device needs to be connected explicitly, or in a visually understandable manner, to a device that is connected to a control network from which diagnosis information is to be acquired. This means that to acquire diagnosis information on a connection network, the engineering device needs to be directly connected to the device that is connected to the control network on which diagnosis information is to be acquired, or the engineering device needs to be connected a device that is connected to another control network separate from the control network on which diagnosis information is to be acquired; and a device connected to the control network on which diagnosis information is to be acquired needs to be explicitly, or clearly designated via the control network separate from the control network on which diagnosis information is to be acquired, thereby acquiring the diagnosis information from the designated device in remote control.

Patent Literature 1 and Patent Literature 2 disclose a method of acquiring a diagnosis information from an engineering device without explicitly designating the device that is connected to a control network on which diagnosis information is to be acquired.

CITATION LIST

Patent Literatures

Patent Literature 1: International Publication No. WO2008/146380

Patent Literature 2: Japanese Patent Application Laid-open No. H4-32905

SUMMARY

Technical Problem

According to the method disclosed in Patent Literature 1 and Patent Literature 2, a network unit needs to collect information with regard to all the devices present in a control system; however, it is not necessary to communicate with all the devices when acquiring the diagnosis information on the control network and a waste of the communication band (time and data amount). Further, in Patent Literature 2, only the address of the destination device is presented to a user, and the user still needs to give instructions regarding from which device the diagnosis information is to be acquired.

The present invention has been achieved in view of the above problems, and an objective of the present invention is to provide a network unit that, when acquiring diagnosis information on a control network, does not require a user to explicitly give instructions regarding from which device diagnosis information is to be acquired.

Solution to Problem

To solve the problem and achieve the objective mentioned above, the present invention relates to a network unit that includes a network unit, in a control system including a plurality of programmable logic controllers and a plurality of control networks respectively allocated with a network number, that can create diagnosis information used in a connection between the programmable logic controllers and the control networks, allocated with a station number, and indicating a state of a control network connected with the network unit. The network unit includes: a diagnosis-information transmission request unit that transmits a diagnosis-information transmission request while assuming a destination station number to be a value other than the station number and designating a destination network number; a routing control unit that stores routing information indicating correspondence between a destination control network and identification information on a network unit that is a relay station for the destination control network, and relay-controls the diagnosis-information transmission request received from the diagnosis-information transmission request unit in the network unit, another network unit connected to same programmable logic controller as the network unit, or a control network connected to the network unit, in accordance with the routing information; and a diagnosis-information creation unit that creates the diagnosis information when having received the diagnosis-information transmission request having a network number of the control network connected to the network unit as the destination network number, and transmits the created diagnosis information to a sender of the diagnosis-information transmission request.

Advantageous Effects of Invention

The network unit according to the present invention can acquire diagnosis information without requiring a user to explicitly give instructions regarding from which device the diagnosis information is to be acquired.

BRIEF DESCRIPTION OF DRAWINGS

FIG. 4A is a diagram illustrating an example configuration of routing information.

FIG. 4B is a diagram illustrating an example configuration of routing information.

FIG. 4C is a diagram illustrating an example configuration of routing information.

DESCRIPTION OF EMBODIMENTS

Exemplary embodiments of a network unit according to the present invention will be explained below in detail with reference to the accompanying drawings. Note that the present invention is not limited to the embodiments.

Embodiment

Figure 1:
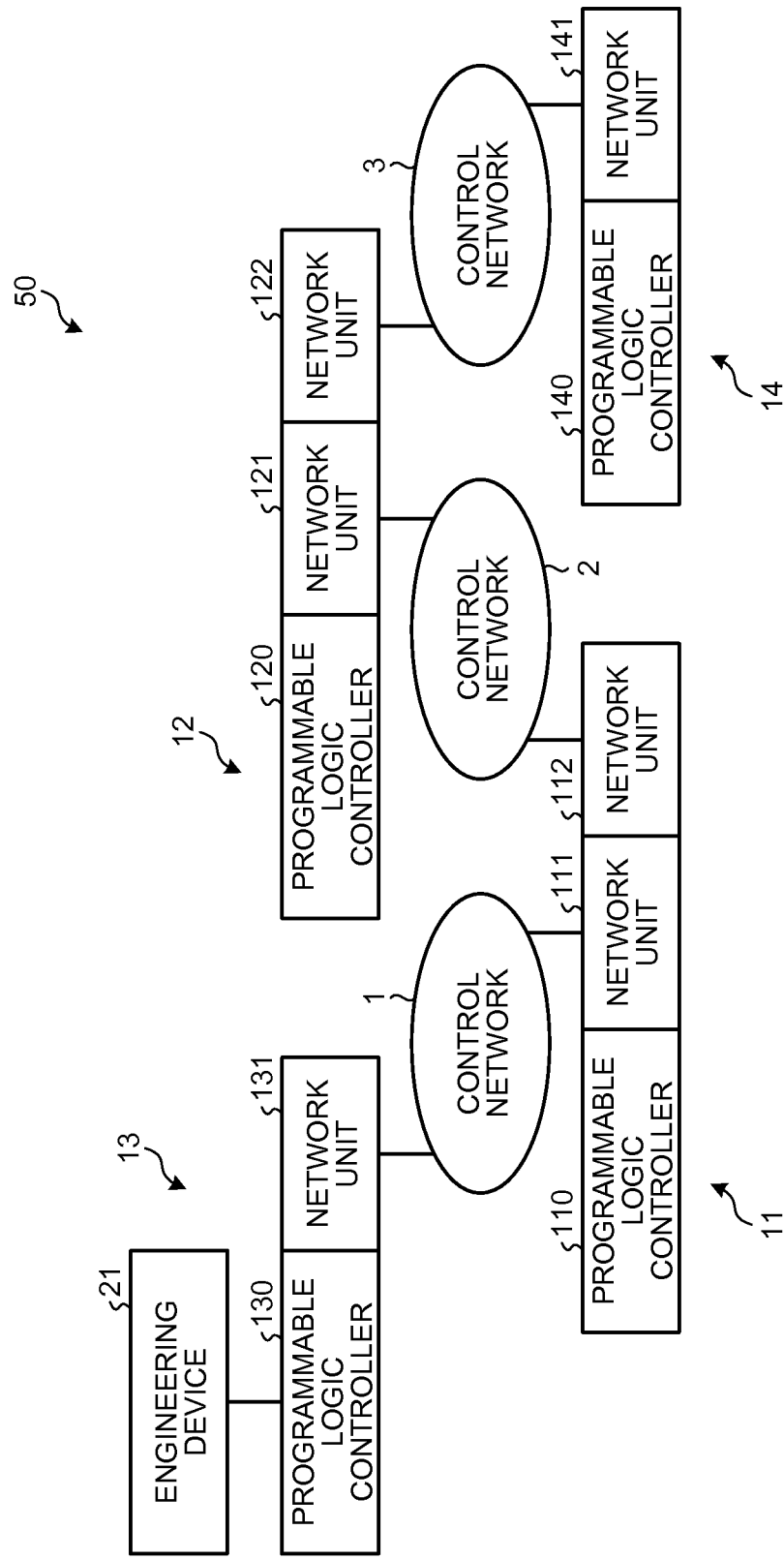
FIG. 1 is a diagram illustrating a configuration of a control system that uses a network unit according to the present invention.

FIG. 1 is a diagram illustrating a configuration of a control system that uses a network unit according to the present invention. A control system 50 is configured to include a plurality of PLC systems 11, 12, 13, and 14; and a plurality of control networks 1, 2, and 3. The PLC system 13 is connected to the control network 1. The PLC system 14 is connected to the control network 3. The PLC system 11 is connected to both the control networks 1 and 2. The PLC system 12 is connected to both the control networks 2 and 3. A network number "1" is allocated to the control network 1, a network number "2" is allocated to the control network 2, and a network number "3" is allocated to the control network 3.

The PLC system 13 includes a programmable logic controller 130 and a network unit 131. The PLC system 14 includes a programmable logic controller 140 and a network unit 141. The PLC system 11 includes a programmable logic controller 110 and network units 111 and 112. The PLC system 12 includes a programmable logic controller 120 and network units 121 and 122.

The network units 111 and 131 are on the control network 1. A station number "1" is allocated to the network unit 131, and a station number "2" is allocated to the network unit 111. The network units 112 and 121 are on the control network 2. A station number "1" is allocated to the network unit 112, and a station number "2" is allocated to the network unit 121. The network units 122 and 141 are on the control network 3. A station number "1" is allocated to the network unit 122, and a station number "2" is allocated to the network unit 141.

The PLC system 11 connects the control network 1 and the control network 2 by using the network unit 111 and the network unit 112. The PLC system 12 connects the control network 2 and the control network 3 by using the network unit 121 and the network unit 122.

An engineering device can be connected to the PLC systems 11, 12, 13, and 14; and a user can refer to diagnosis information on the control networks 1, 2, and 3 by using the engineering device connected to the PLC systems 11, 12, 13, and 14. In FIG. 1, a state where an engineering device 21 is connected to the PLC system 13 is illustrated.

Figure 2:
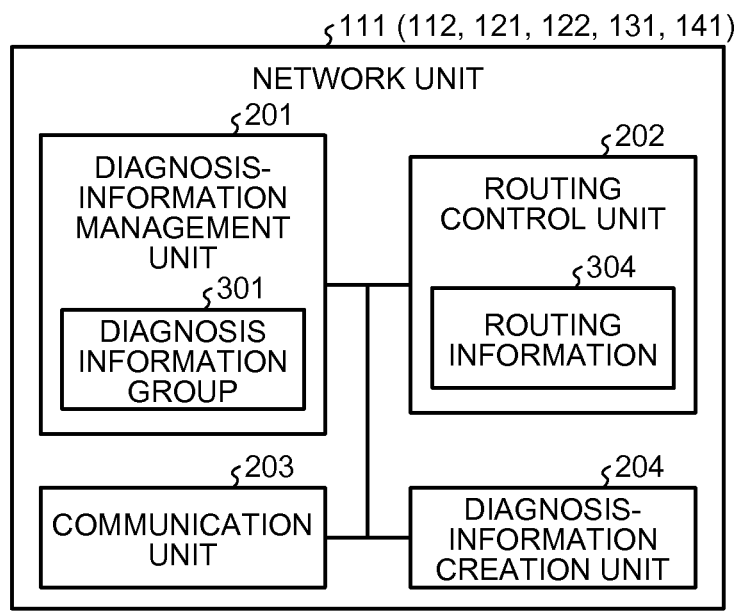
FIG. 2 is a diagram illustrating a configuration of a network unit according to an embodiment.

FIG. 2 is a diagram illustrating a configuration of the network unit according to the present embodiment. The network unit 111 includes a diagnosis-information management unit 201, a routing control unit 202, a communication unit 203, and a diagnosis-information creation unit 204. The network unit 111 is described as an example, but other network units 112, 121, 122, 131, and 141 are similarly configured.

The communication unit 203 transmits and receives data between other network units. When data to be transmitted or transferred is addressed to a device on a control network other than the control network to which a PLC system that has the station number of the communication unit 203 belongs, or the network unit it belongs to, the communication unit 203 makes an inquiry to the routing control unit 202 regarding the transmission destination or the transfer destination of data in order to determine the transmission destination or the transfer destination of data in accordance with instruction from the routing control unit 202. The routing control unit 202 relay-controls a transmission request described later (a diagnosis-information transmission request) or response data received from the diagnosis-information management unit 201 of the network unit, the other network unit connected to the same programmable logic controller of the network unit, or the control network connected to the network unit, based on routing information 304.

Figure 3:
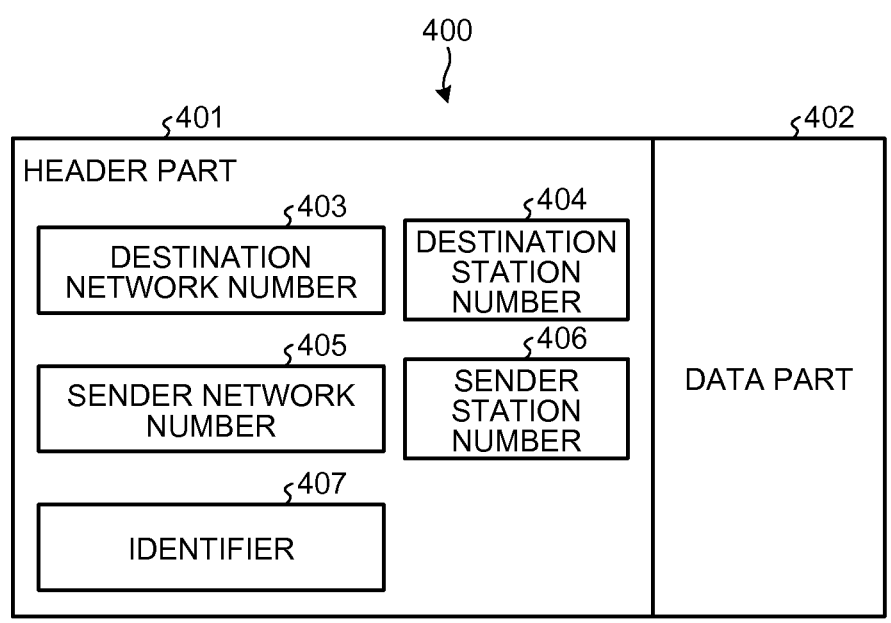
FIG. 3 is a diagram illustrating a structure of data transmitted or transferred by a communication unit.

FIG. 3 is a diagram illustrating a structure of data transmitted or transferred by the communication unit. A packet 400 to be used by the communication unit 203 when transmitting or transferring data includes a header part 401 and a data part 402. The header part 401 includes a destination network number 403 and a destination station number 404 as information indicating the destination of data to be transmitted or transferred. The header part 401 also includes a sender network number 405 and a sender station number 406 as sender information for identifying a device that has transmitted the data, and it includes an identifier 407 indicating the type of the packet 400 (a transmission request or response data described later). The entity of the data is stored in the data part 402.

Figure 4D:
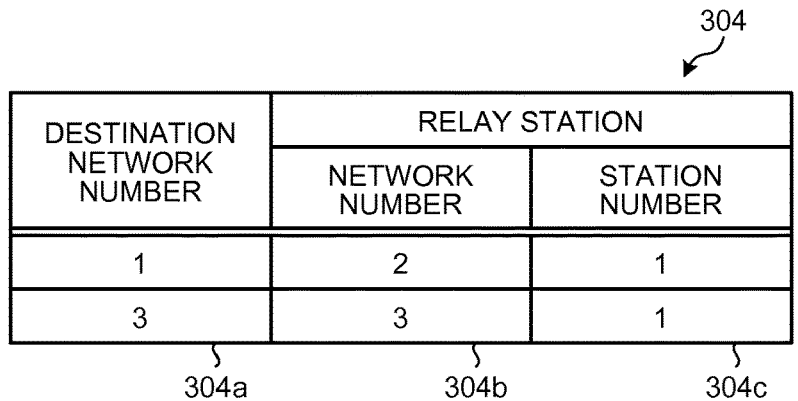
FIG. 4D is a diagram illustrating an example configuration of routing information.
Figure 4E:
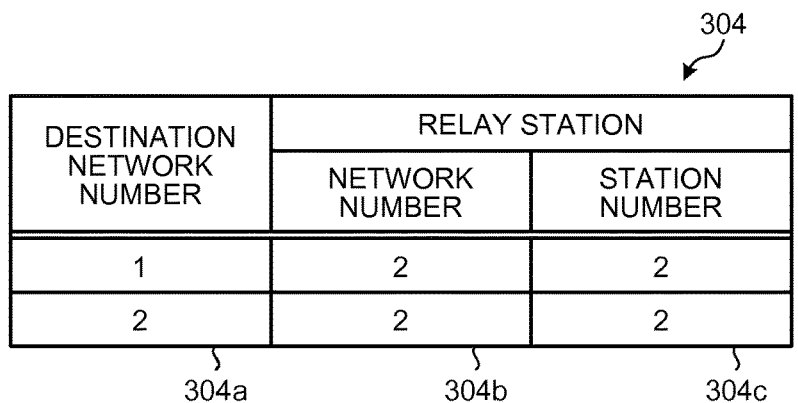
FIG. 4E is a diagram illustrating an example configuration of routing information.
Figure 4F:
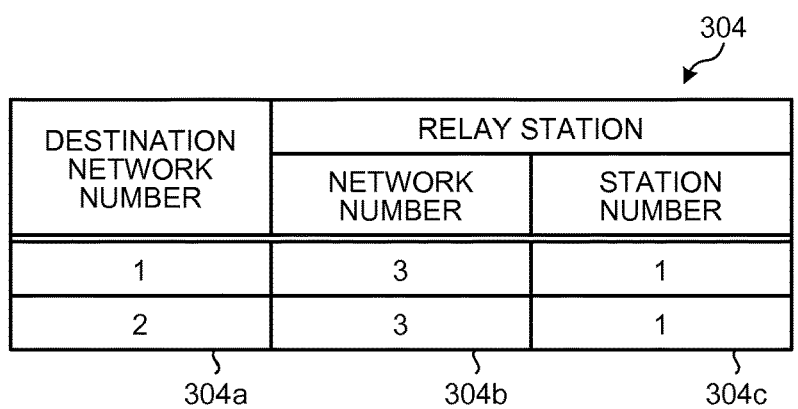
FIG. 4F is a diagram illustrating an example configuration of routing information.

The routing control unit 202 holds the routing information 304. FIGS. 4A to 4F are diagrams illustrating example configurations of the routing information. FIG. 4A illustrates the routing information 304 of the network unit 131. FIG. 4B illustrates the routing information 304 of the network unit 111. FIG. 4C illustrates the routing information 304 of the network unit 112. FIG. 4D illustrates the routing information 304 of the network unit 121. FIG. 4E illustrates the routing information 304 of the network unit 122. FIG. 4F illustrates the routing information 304 of the network unit 141. In the routing information 304, a network number (relay-station network number) 304b and a station number (relay-station station number) 304c of the network unit (the relay station) to pass through in order to deliver the data to the destination network are associated with a network number (destination network number) 304a of the network that is the destination of the data.

The routing information 304 can be manually set for the network units 111, 112, 121, 122, 131, and 141 by an operator. However, the routing information 304 can be automatically generated by the network units 111, 112, 121, 122, 131, and 141 by using a well-known method, without requiring any operation by the operator.

The routing control unit 202 sends an instruction to the communication unit 203 to search for the network number that is the same as the destination network number 403 described in the header part 401 of the data to be delivered from the destination network numbers 304a in the routing information 304, and it then transfer the data to the network unit identified by the network number 304b and the station number 304c associated with the selected destination network number 304a. Taking the network unit 121 as an example, the routing control unit 202 sends an instruction to the communication unit 203 to deliver data addressed to a device connected to the control networks 1 and 3 but not the control network 2 connected with the network unit 121 to an appropriate transfer destination according to the routing information 304. Specifically, the routing control unit 202 of the network unit 121 sends an instruction to the communication unit 203 to transfer the data addressed to the device connected to the control network 1 to the network unit 112 having the network number "2" and the station number "1", by referring to the routing information 304 illustrated in FIG. 4D. The routing control unit 202 of the network unit 121 sends an instruction to the communication unit 203 to transfer the data addressed to the device connected to the control network 3 to the network unit 122 having the network number "3" and the station number "1".

The diagnosis-information management unit 201 has a function whereby it acts as a diagnosis-information transmission request unit that transmits a transmission request. The diagnosis-information management unit 201 transmits a transmission request regularly or in accordance with a request from the engineering device connected to the PLC systems 11, 12, 13, and 14; collects diagnosis information on the control networks 1, 2, and 3 included in the control system 50; and holds the diagnosis information as a diagnosis information group. The diagnosis-information creation unit 204 creates diagnosis information on the control network connected to the network unit.

Figures 5, 6:
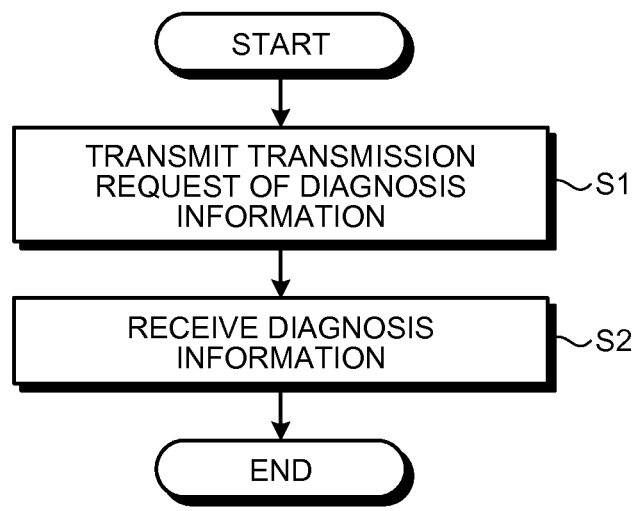
FIG. 5 is a diagram illustrating an example configuration of a diagnosis information group.
FIG. 6 is a diagram illustrating a procedure for collecting diagnosis information performed by a diagnosis-information management unit.

FIG. 5 is a diagram illustrating an example configuration of the diagnosis information group. A diagnosis information group 301 includes a plurality of records including diagnosis information 302 as a field. The diagnosis information 302 indicates the state of respective control networks 1, 2, and 3 constituting the control system 50, and it is held as a record (a record including a network number 303, diagnosis information 302, and a flag 305 as a field) in which the network number 303 being an identifier to identify the control networks 1, 2, and 3 and the flag 305 indicating whether the diagnosis information 302 has been acquired at the most recent time of collecting the diagnosis information are associated with each other. The flag 305 represents either an acquired state or a non-acquired state; and the diagnosis information 302 of the network number 303 associated with the flag 305 representing an acquired state is the latest information. Conversely, the diagnosis information 302 of the network number 303 associated with the flag 305 representing a non-acquired state is not the latest information.

FIG. 6 is a diagram illustrating a procedure for collecting diagnosis information by the diagnosis-information management unit. The diagnosis-information management unit 201 requests the transmission of the diagnosis information 302 (Step S1), and after due procedures, receives the diagnosis information 302 (Step S2).

Figure 7:
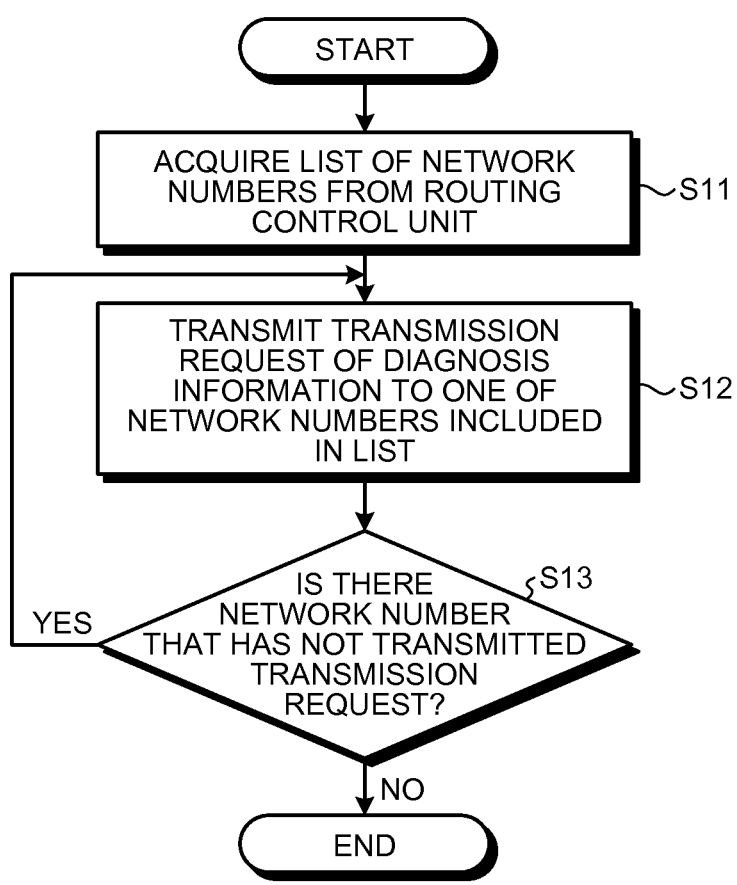
FIG. 7 is a diagram illustrating details of a process for transmitting a request to transmit diagnosis information.

FIG. 7 is a diagram illustrating details of a process (a process at Step S1) for transmitting a transmission request for diagnosis information. The diagnosis-information management unit 201 acquires a list of network numbers described in the routing information 304 as the destination network number 304a from the routing control unit 202 (Step S11). The diagnosis-information management unit 201 requests the communication unit 203 transmit a transmission request for diagnosis information to one of the network numbers included in the list acquired at Step S11 (Step S12). After the communication unit 203 has transmitted the transmission request, the diagnosis-information management unit 201 changes the flag 305 with respect to the network number corresponding to the destination network number in the diagnosis information group 301 to a non-acquired state. If there is a network number that has not transmitted the transmission request in the network numbers included in the list acquired at Step S11 (if the network number 303 associated with the flag 305 representing the acquired state is in the diagnosis information group 301), then the diagnosis-information management unit 201 repeats Step S12 with a change of the destination network number (YES at Step S13); and finishes the process when there is no network number that has not transmitted the transmission request (NO at Step S13).

In the packet 400, which is a transmission request, a network number of the control network, of which receiving diagnosis information is desired, is described in the destination network number 403 of the header part 401. An appropriate implementation-dependent station number is described in the destination station number 404. The appropriate implementation-dependent station number refers to either a prescribed value that does not indicate any specific network unit or a prescribed value allocated in advance for a management station. The data part 402 is set to be blank.

As illustrated in FIG. 1, when the engineering device 21 is connected to the PLC 130 of the PLC system 13, and the network unit 131 requests diagnosis information on the control network 3, the diagnosis-information management unit 201 of the network unit 131 creates a transmission request with the destination network number being "3"; and it requests the communication unit 203 to transmit the transmission request. The communication unit 203 of the network unit 131 makes an inquiry to the routing control unit 202 of the network unit 131 regarding the transmission destination of the transmission request. The routing control unit 202 of the network unit 131 sends an instruction to the communication unit 203 of the network unit 131 to transmit the transmission request to the network unit 111 having the network number "1" and the station number "2", in accordance with the routing information 304. The communication unit 203 of the network unit 131 transmits the transmission request to the network unit 111 according to an instruction from the routing control unit 202.

The communication unit 203 of the network unit 111 having received the transmission request addressed to the control network 3 from the network unit 131 makes an inquiry to the routing control unit 202 of the network unit 111 regarding the transfer destination of the transmission request. The routing control unit 202 of the network unit 111 sends an instruction to the communication unit 203 of the network unit 111 to transfer the transmission request to the network unit 112 having the network number "2" and the station number "1" in accordance with the routing information 304. The communication unit 203 of the network unit 111 transfers the transmission request to the network unit 112 in accordance with an instruction from the routing control unit 202.

By performing the procedure repeatedly, the transmission request created by the network unit 131 is transmitted from the network unit 131 to the network unit 122 on the control network 3.

If a prescribed value that does not indicate any specific network unit is described as the destination station number 404 in the header part 401 of the transmission request with the destination network number being "3", a network unit having received the transmission request first (in this example, the network unit 122), of the network units 122 and 141 on the control network 3, creates the diagnosis information on the control network 3. In other words, the network unit 122, which has received the transmission request from the network unit 121 connected to the programmable logic controller 120 that is the same as the network unit, creates the diagnosis information. That is, the diagnosis-information creation unit 204 of the network unit 122 having received the transmission request first on the control network 3 refers to the identifier 407 included in the header part 401 of the transmission request to recognize that the received data is a transmission request, and it creates the diagnosis information on the control network 3. The diagnosis-information creation unit 204 creates response data addressed to the network unit identified by the sender network number 405 and the sender station number 406 described in the header part 401 of the transmission request (in this example, the network unit 131), and it requests that the communication unit 203 transmit the response data to the identified network unit.

Meanwhile, if a prescribed value indicating the management station is described as the destination station number 404 in the header part 401 of the transmission request with the destination network number being "3", the transmission request is transferred to one of the network units 122 and 141 on the control network 3, which is designated as the management station. (If the network unit 141 is designated as the management station, the transmission request is transferred to the network unit 141 from the network unit 122.) The diagnosis-information creation unit 204 in the one of the network units 122 and 141 designated as the management station refers to the identifier 407 included in the header part 401 of the transmission request to recognize that the received data is the transmission request, and it creates diagnosis information on the control network 3. The diagnosis-information creation unit 204 creates response data addressed to the network unit identified by the sender network number 405 and the sender station number 406 described in the header part 401 of the transmission request (in this example, the network unit 131), and it requests that the communication unit 203 transmit the response data to the identified network unit.

In a case where a prescribed value that does not indicate any specific network unit is described as the destination station number 404 in the header part 401 of the transmission request with the destination network number being "3", a network unit having received the transmission request first, of the network units 122 and 141 on the control network 3, can request the creation of the diagnosis information and transmission of the response data to the management station.

In the packet 400 as the response data with respect to the transmission request, the sender network number 405 and the sender station number 406 described in the header part 401 of the transmission request are respectively described in the destination network number 403 and the destination station number 404 of the header part 401. The network number and the station number of the network unit that has transmitted the response data are respectively described in the sender network number 405 and the sender station number 406 as the sender information of the response data. Information indicating that the data is response data is described in the identifier 407. The diagnosis information is stored in the data part 402.

The packet 400 of the response data is transferred to the network unit 111 on the control network 1 similarly to the transmission request, in accordance with the routing information 304 held by the respective network units 111, 112, 121, 122, 131, and 141. The communication unit 203 of the network unit 111 transfers the packet 400 of the response data to the network unit 131 according to the station number (in this example, "1") described as the destination station number 404 in the header part 401. Accordingly, the packet 400 of the response data reaches the network unit 131 specified by the destination network number 403 and the destination station number 404.

Figure 8:
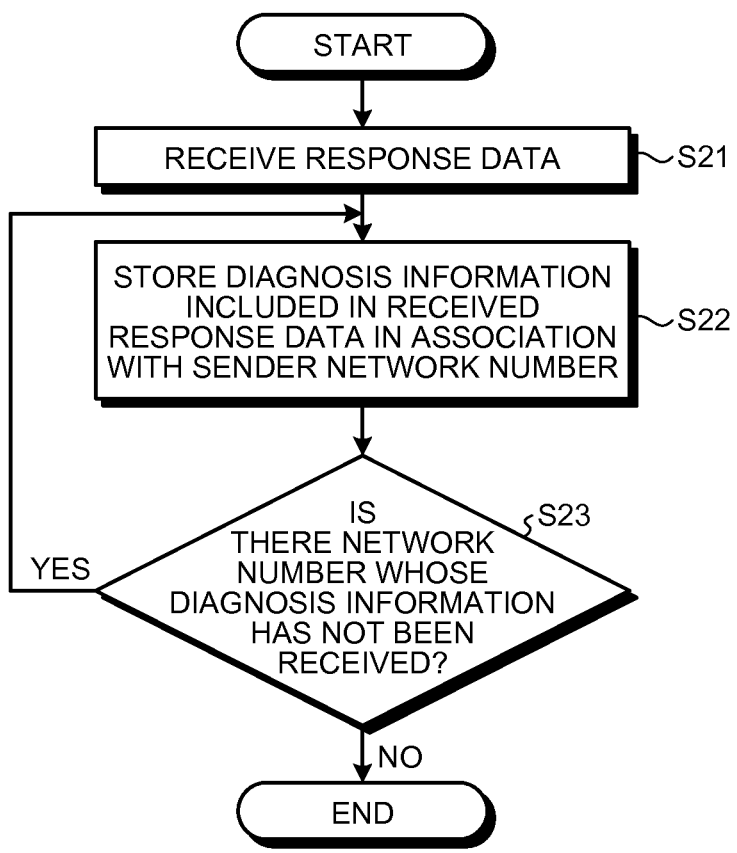
FIG. 8 is a diagram illustrating details of a process for receiving diagnosis information.

FIG. 8 is a diagram illustrating details of a process for receiving diagnosis information (a process at Step S2). The diagnosis-information management unit 201 receives the response data as a response to the transmission request transmitted at Step S1 (Step S21), and it stores the response data with the diagnosis information 302 included in the received response data being associated with the sender network number (Step S22). The diagnosis-information management unit 201 determines whether the received data is the response data by referring to the identifier 407 included in the header part 401. Upon receiving the response data, the diagnosis-information management unit 201 changes the flag 305 with respect to the corresponding record in the diagnosis information group 301 so as to represent an acquired state in accordance with the sender network number 405 described in the header part 401 of the response data. If there is a control network of which diagnosis information 302 is to be received (if there is a network number 303 associated with the flag 305 representing a non-acquired state in the diagnosis information group 301), the diagnosis-information management unit 201 repeats Step S22 (YES at Step S23); and if there is no control network of which diagnosis information 302 is to be received, the process finishes (NO at Step S23).

With respect to a network number of a control network of which diagnosis information 302 is not received even after a certain time has elapsed since transmission of a transmission request for the diagnosis information 302, retransmission of the transmission request or display of a transmission error with respect to a user can be generally performed. However, descriptions thereof will be omitted here.

According to the method described above, the diagnosis-information management unit 201 can acquire the diagnosis information 302 for all the control networks that can deliver data and for which a network number is described in the routing information 304. Therefore, the diagnosis information can be acquired even if a user does not explicitly instruct from which device the diagnosis information is to be acquired.

Furthermore, when the routing information 304 is to be generated automatically, the network number of the control network, of which diagnosis information 302 is to be acquired, is automatically set. Accordingly, the diagnosis information can be collected from the control network that can deliver data from the network unit of the control networks constituting the system without requiring any action by a user.

In the example described above, the routing information includes information on the relay station corresponding to all the control networks included in the control system. Note that the routing information, however, can include information on the relay station for a part of the control networks included in the control system. For example, when the respective network units have information on the relay station for the control networks having a number of hops equal to or less than a predetermined threshold, the diagnosis information can be acquired from the control networks having a number of hops equal to or less than the predetermined threshold even if a user does not explicitly instruct from which device the diagnosis information is to be acquired.

Further, in the above descriptions, it is assumed that the diagnosis-information creation unit creates diagnosis information. However, the diagnosis-information management unit can have the function of creating diagnosis information.

INDUSTRIAL APPLICABILITY

As described above, the network unit according to the present invention is useful for acquiring diagnosis information without requiring a user to explicitly give an instruction regarding from which device the diagnosis information is to be acquired, and it is appropriately applicable to a large-scale control system that has a large number of nodes.

REFERENCE SIGNS LIST 1, 2, 3 control network, 11, 12, 13, 14 PLC system, 21 engineering device, 50 control system, 110, 120, 130, 140 PLC, 111, 112, 121, 122, 131, 141 network unit, 201 diagnosis-information management unit, 202 routing control unit, 203 communication unit, 204 diagnosis-information creation unit, 301 diagnosis information group, 302 diagnosis information, 303 network number, 304 routing information, 304a, 403 destination network number, 304b relay-station network number, 304c relay-station station number, 305 flag, 400 packet, 401 header part, 402 data part, 404 destination station number, 405 sender network number, 406 sender station number, 407 identifier.

The invention claimed is:

1. A network unit, in a control system including a plurality of programmable logic controllers and a plurality of control networks respectively allocated with a network number, that can create diagnosis information, the network unit indicates a state of a control network connected with the network unit, the network unit comprising:
    a diagnosis-information transmission request unit that transmits a diagnosis-information transmission request comprising a header part that includes a destination network number indicating a respective control network from among the plurality of control networks and a destination station number which represents the network unit which connects a respective programmable logic controller from among the plurality of programmable logic controllers to the respective control network, wherein the destination stations number is a predetermined number of a value other than any station number assigned to any network unit;
    a routing control unit that:
        stores routing information indicating correspondence between a destination control network and identification information on a network unit that is a relay station for the destination control network, and
        relay-controls the diagnosis-information transmission request received from the diagnosis-information transmission request unit in the network unit, or another network unit connected to the same programmable logic controller as the network unit, or a control network connected to the network unit, in accordance with the routing information; and
    a diagnosis-information creation unit that:
        creates the diagnosis information in response to receiving the diagnosis-information transmission request having a network number of the control network connected to the network unit as the destination network number, and
        transmits the created diagnosis information to a sender of the diagnosis-information transmission request,
    wherein the network unit further comprises a diagnosis-information management unit that, after the diagnosis-information transmission request has been transmitted, changes a flag with respect to the network number corresponding to the destination network number in a diagnosis information group to a non-acquired state.

2. The network unit according to claim 1, wherein the diagnosis-information transmission request unit transmits the diagnosis-information transmission request while designating the network number of each control network of which identification information is included in the routing information as the destination network number.

3. The network unit according to claim 1, wherein the diagnosis-information transmission request unit manages the diagnosis information received as a response to the diagnosis-information transmission request in association with the network number of the control network connected with the network unit that has transmitted the diagnosis information.

4. The network unit according to claim 1, wherein the diagnosis-information creation unit creates the diagnosis information in response to receiving the diagnosis-information transmission request from another network unit connected with the same programmable logic controller as the network unit.

5. The network unit according to claim 1, wherein when the diagnosis-information transmission request unit transmits the diagnosis-information transmission request while designating a value indicating a management station in the control network as the destination station number, the diagnosis-information creation unit creates the diagnosis information when the network unit is set as the management station.

6. The network unit according to claim 1, wherein the header part of the diagnosis-information transmission request further comprises a sender network number, and a sender station number, wherein the destination station number is the predetermined number assigned in advance for a management station and does not indicate any of network units in the plurality of programmable logic controllers, and the sender network number and the sender station number identify a device that has transmitted the data, and
wherein the diagnosis-information transmission request further comprises a blank data part.

7. The network unit according to claim 6, wherein
the header part further includes an identifier that recognizes that the received data is a diagnosis-information transmission request or a response data to the diagnosis-information transmission request.

8. A network unit, in a control system including a plurality of programmable logic controllers and a plurality of control networks respectively allocated with a network number, that can create diagnosis information, the network unit indicates a state of a control network connected with the network unit, the network unit comprising:
  a diagnosis-information transmission request unit that transmits a diagnosis-information transmission request comprising a header part that includes a destination network number indicating a respective control network from among the plurality of control networks and a destination station number which represents the network unit which connects a respective programmable logic controller from among the plurality of programmable logic controllers to the respective control network wherein the destination stations number is a predetermined number of a value other than any station number assigned to any network unit;
  a routing control unit that:
    stores routing information indicating correspondence between a destination control network and identification information on a network unit that is a relay station for the destination control network, and
    relay-controls the diagnosis-information transmission request received from the diagnosis-information transmission request unit in the network unit, or another network unit connected to the same programmable logic controller as the network unit, or a control network connected to the network unit, in accordance with the routing information; and
  a diagnosis-information creation unit that:
    creates the diagnosis information in response to receiving the diagnosis-information transmission request having a network number of the control network connected to the network unit as the destination network number, and
    transmits the created diagnosis information to a sender of the diagnosis-information transmission request,
  wherein the network unit further comprises a diagnosis-information management unit that, in response to determining that there is a network number that has not transmitted the diagnosis-information transmission request in the network numbers included in an acquired list, repeats transmission of the diagnosis-information transmission request to the network numbers included in the acquired list until there is no network number that has not transmitted the diagnosis-information transmission request.

9. The network unit according to claim 8, wherein
the diagnosis-information transmission request unit transmits the diagnosis-information transmission request while designating the network number of each control network of which identification information is included in the routing information as the destination network number.

10. The network unit according to claim 8, wherein
the diagnosis-information transmission request unit manages the diagnosis information received as a response to the diagnosis-information transmission request in association with the network number of the control network connected with the network unit that has transmitted the diagnosis information.

11. The network unit according to claim 8, wherein
the diagnosis-information creation unit creates the diagnosis information in response to receiving the diagnosis-information transmission request from another network unit connected with the same programmable logic controller as the network unit.

12. The network unit according to claim 8, wherein
when the diagnosis-information transmission request unit transmits the diagnosis-information transmission request while designating a value indicating a management station in the control network as the destination station number, the diagnosis-information creation unit creates the diagnosis information when the network unit is set as the management station.

13. The network unit according to claim 1, wherein
the header part of the diagnosis-information transmission request further comprises a sender network number, and a sender station number, wherein the destination station number is the predetermined number assigned in advance for a management station and does not indicate any of network units in the plurality of programmable logic controllers, and the sender network number and the sender station number identify a device that has transmitted the data, and
wherein the diagnosis-information transmission request further comprises a blank data part.

14. The network unit according to claim 13, wherein
the header part further includes an identifier that recognizes that the received data is a diagnosis-information transmission request or a response data to the diagnosis-information transmission request.

* * * * *